United States Patent
Shani et al.

(10) Patent No.: US 9,652,509 B2
(45) Date of Patent: May 16, 2017

(54) PRIORITIZATION OF CONTINUOUS DEPLOYMENT PIPELINE TESTS

(75) Inventors: Inbar Shani, Kibutz Beit Kama (IL); Amichai Nitsan, Rehovot (IL); Sigal Maon, Jerusalem (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 237 days.

(21) Appl. No.: 14/375,005

(22) PCT Filed: Apr. 30, 2012

(86) PCT No.: PCT/US2012/035874
§ 371 (c)(1),
(2), (4) Date: Jul. 28, 2014

(87) PCT Pub. No.: WO2013/165367
PCT Pub. Date: Nov. 7, 2013

(65) Prior Publication Data
US 2015/0026121 A1    Jan. 22, 2015

(51) Int. Cl.
G06F 17/30       (2006.01)
G06F 11/36       (2006.01)
H04L 29/08       (2006.01)

(52) U.S. Cl.
CPC ...... *G06F 17/3053* (2013.01); *G06F 11/3688* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,522,083 B1 * | 8/2013 | Cohen | G06F 11/3672 714/38.1 |
| 8,677,315 B1 * | 3/2014 | Anderson | G06F 8/60 717/101 |
| 2003/0204836 A1 * | 10/2003 | Srivastava | G06F 11/3676 717/124 |
| 2004/0268308 A1 * | 12/2004 | Srivastava | G06F 11/368 717/120 |
| 2006/0129994 A1 | 6/2006 | Srivastava et al. | |
| 2007/0250574 A1 | 10/2007 | Tseitlin et al. | |
| 2008/0256392 A1 | 10/2008 | Garland et al. | |
| 2009/0138856 A1 | 5/2009 | Oja et al. | |
| 2009/0265681 A1 | 10/2009 | Beto | |

(Continued)

OTHER PUBLICATIONS

Hyunsook Do et al: "Prioritizing JUnit Test Cases: An Empirical Assesment and Cos-Benefits Analysis", Empirical Software Engineering; an international Journal, Kluwer Academic Publishers, BO, vol. 11, No. 1, Mar. 1, 2006 (Mar. 1, 2006), pp. 33-70, XP019206492.

(Continued)

*Primary Examiner* — Bai D. Vu
(74) *Attorney, Agent, or Firm* — Hewlett Packard Enterprise Patent Development

(57) ABSTRACT

A method to prioritize a plurality of tests in a continuous deployment pipeline. The method ranks the plurality of tests based on a test attribute and a test context to provide a test rank for each of the plurality of tests. The method sets a test set for the continuous deployment pipeline using the test ranks. The method executes the test set in the continuous deployment pipeline.

18 Claims, 6 Drawing Sheets

(56) References Cited

U.S. PATENT DOCUMENTS

| | | | |
|---|---|---|---|
| 2009/0265693 A1 | 10/2009 | Bakowski | |
| 2012/0266023 A1* | 10/2012 | Brown | G06F 11/3684 714/32 |
| 2013/0055028 A1* | 2/2013 | Patil | G06F 11/3672 714/38.1 |
| 2013/0104105 A1* | 4/2013 | Brown | G06F 11/3684 717/124 |
| 2013/0254746 A1* | 9/2013 | Balakrishnan | G06F 11/3608 717/124 |
| 2014/0372989 A1* | 12/2014 | Shani | G06F 8/70 717/131 |
| 2015/0052501 A1* | 2/2015 | Shani | G06F 8/60 717/124 |

OTHER PUBLICATIONS

Saff D et al: "Continuous Testing in Eclipse", Electronic Notes in Theoretical Computer Science, Elsevier, Amsterdam, NL, vol. 107, Dec. 12, 2004 (Dec. 12, 2004), pp. 103-117, XP004672321.

Supplementary European Search Report, Nov. 23, 2015, European Patent Application No. 12876000.6, 9 pages.

Bernier, B., Implementing a Continuous Deployment Pipeline with Hudson, Apr. 4, 2011, 4 pages http://techblog.chegg.com/2011/04/04/implementing-a-continuous-deployment-pipeline-with-hudso.

Evanish, J., Continuous Deployment: Possibility or Pipe Dream?, Nov. 21, 2011, 4 pages http://bostinno.com/2011/11/21/continuous-deployment-possibility-or-pipe-dream/.

Korean Intellectual Property Office, International Search Report and Written Opinion, Dec. 14, 2012, 9 pages, Daejeon Metropolitan City, Republic of Korea.

Powell, C., Who's Afraid of Continuous Deployment?, Dec. 16, 2011, 5 pages http://java.dzone.com/articles/whos-afraid-continuous.

Sarkar, S. et al., Modularization of a Large-scale Business Application: a Case Study, Mar.-Apr. 2009, 8 pages http://ieeexplore.ieee.org/xpl/freeabs_all.jsp?arnumber=4786949.

Humphreys, B., "Stop Testing So Much!" (Web Page), Nov. 5, 2008, 6 pages, available at http://blogs.atlassian.com/2008/11/stop_testing_so_much/.

Jiang, B. et al. "How Well Do Test Case Prioritization Techniques Support Statistical Fault Localization," 2009 33rd Annual IEEE International Computer Software and Applications Conference, vol. 1, 9 pages, available at http://www.cs.hku.hk/research/techreps/document/TR-2009-09.pdf.

Rothermel, G. et al., "Test Case Prioritization: An Empirical Study," (Research Paper), Software Maintenance (ICSM'99), 1999, IEEE International Conference on, 10 pages, available at http://cse.unl.edu/~grother/papers/icsm99.pdf.

sourceforge.net, "ProTest," (Web Page), Jan. 3, 2007, 2 pages, available at https://sourceforge.net/projects/protest/.

Walcott, K. R. et al., "Time-Aware Test Suite Prioritization," (Research Paper), Proceedings of the 2006 International Symposium on Software Testing and Analysis, ACM, 2006, 11 pages, available at https://www.st.cs.uni-saarland.de/edu/recommendation-systems/papers/p1-walcott.pdf.

Yoo, S. et al., "TR-09-09: Regression Testing Minimisation, Selection and Prioritisation—A Survey," (Research Paper), Technical Report TR-09-09, Department of Computer Science, King's College London, 2009, 81 pages, available at https://www.researchgate.net/profile/Mark_Harman/publication/227567687_Regression_testing_minimization_selection_and_prioritization_A_survey/links/547c89630cf27ed97860f78b.pdf.

\* cited by examiner

PRIORITIZATION OF CONTINUOUS DEPLOYMENT PIPELINE TESTS

BACKGROUND

Software development life cycles use continuous integration (CI) and continuous deployment (CD) to reduce the time code changes spend in a production line. Continuous integration automates the process of receiving code changes from a specific source configuration management (SCM) tool, constructing deliverable assemblies with the code changes, and testing the assemblies.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
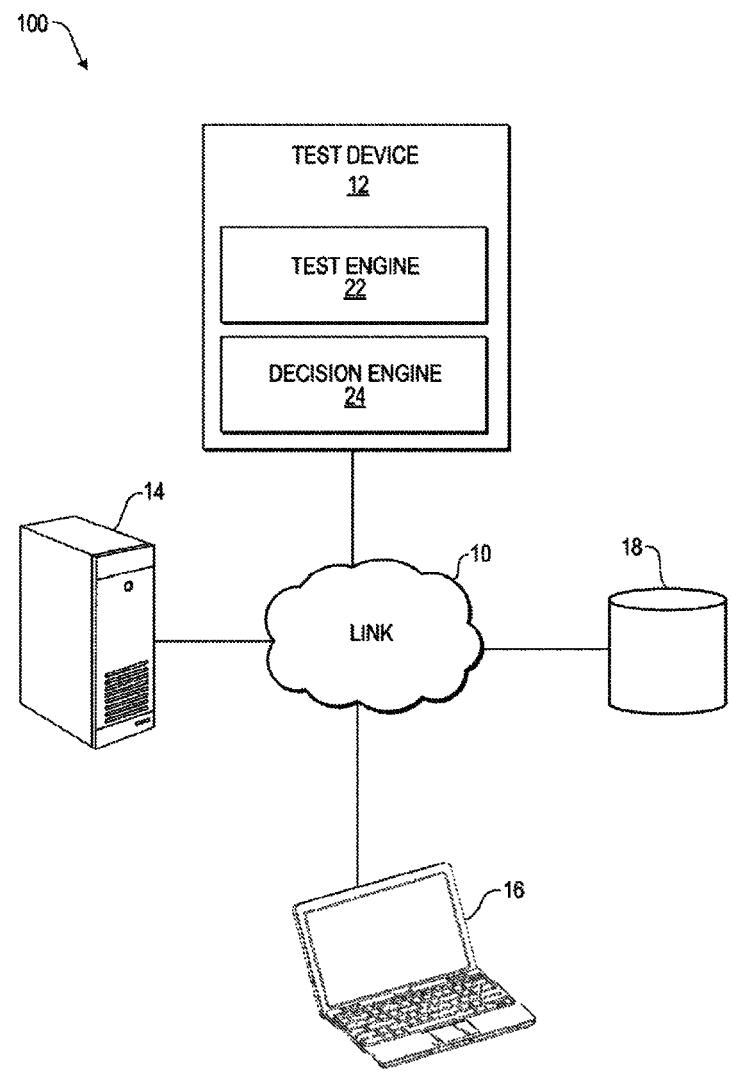
FIG. 1 illustrates a network environment to prioritize a plurality of tests in a continuous deployment pipeline according to an example.

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure.

Continuous integration (CI) and continuous deployment (CD) automate the construction, testing, and deployment of code assemblies with a code change. Continuous integration automates the process of retrieving code changes from the SCM tool, constructing deliverable assemblies, such as executing a build and unit testing the assemblies. The automation begins after a code change is committed to a source configuration management (SCM) tool. When the code change is committed to the SCM tool, the code change is assigned to a particular continuous deployment pipeline (CD pipeline or deployment pipeline). The code change moves through the continuous deployment pipeline as the code change is tested as part of a code assembly.

Continuous deployment extends continuous integration by automatically deploying the assemblies into a test environment and executing testing on the assemblies. The amount of testing is determined by the continuous deployment pipeline. The test sets used for the continuous deployment pipelines are typically static test sets assigned based on the classification of the continuous deployment pipeline, such as low priority or high priority. Typical test sets include unit tests and application programming interface tests. User interface automation tests are rarely included in the test sets due to the execution time being longer than unit tests and application programming interface tests. As a result, the test sets lack a quality guarantee since the test sets do not include user interface tests. Moreover, the test set may be manually set-up to include the user interface tests; however, manual changes to test sets does not guarantee consistency and requires manual operations.

In examples, a method to prioritize a plurality of tests in a continuous deployment pipeline is provided. The method ranks the plurality of tests based on a test attribute and a test context to provide a test rank for each of the plurality of tests. The method sets a test set for the continuous deployment pipeline using the test ranks. The method executes the test set in the continuous deployment pipeline.

The phrase "code change" refers to a change in the source code for any software application. The phrase code change may also refer to a code change that is part of a code assembly constructed as part of a continuous integration process.

The phrase "continuous deployment pipeline" or "deployment pipeline" refers to a set of actions executed serially and/or in parallel on a queue of code changes. For example, the continuous deployment pipeline may include building the code, executing unit tests, deploying the code, running automated tests, staging the code, running end-to-end tests, and deploying the code to production. Each continuous deployment pipeline may be classified to receive code changes that match a defined set of criteria, for example, a specific continuous deployment pipeline may be used for low risk and high priority code changes. The test set used to test the pipeline may similarly be aligned with the defined set of criteria for the code changes.

The phrase "test set" refers to the tests run on a continuous deployment pipeline in a simulated environment. The test set tests functionality and/or identifies deficiencies of the application under test (AUT). The test set may include unit tests to test integration of the code changes and/or functional tests with the code change, such as application programming interface (API) or user interface (UI) tests.

The phrase "test attribute" refers to data associated with tests and previous executions of tests.

The phrase "test context" comprises at least one of a code change, a business priority, and a test value. The test value may include the ability of the test to detect defects, the importance of defects found in a test, and the dependency of the test on other tests.

The phrase "test rank" or "test ranking" refers to a ranking or value assigned to a test based on one or more criteria. The criteria may be defined based on codes changes, test characteristics, business priorities, and/or continuous deployment pipelines associated with the test from prior executions of the test set.

FIG. 1 illustrates a network environment 100 according to an example. The network environment 100 includes a link 10 that connects a test device 12, a deployment device 14, a client device 16, and a data store 18. The test device 12 represents generally any computing device or combination of computing devices that test a plurality of code changes from a deployment device 14. The deployment device 14 represents a computing device that receives the code changes and deploys code changes in the continuous deployment pipeline.

The client device 16 represents a computing device and/or a combination of computing devices configured to interact with the test device 12 and the deployment device 14 via the link 10. The interaction may include sending and/or transmitting data on behalf of a user, such as the code change. The interaction may also include receiving data, such as a software application with the code changes. The client device 16 may be, for example, a personal computing device which includes software that enables the user to create and/or edit code for a software application.

The test device 12 represents a computing device and/or a combination of computing devices configured to prioritize a plurality of tests in a continuous deployment pipeline. The test device 12 is also configured to excute a set of tests or test sets on the continuous deployment pipeline in an application under test environment to integrate the plurality of code changes for use in a software application.

The test set and/or the code changes may be stored in the data store 18. The data store 18 represents generally any memory configured to store data that can be accessed by the test device 12 and the deployment device 14 in the performance of its function. The test device 12 functionalities may be accomplished via the link 10 that connects the test device 12 to the deployment device 14, the client device 16, and the data store 18.

The link 10 represents generally one or more of a cable, wireless, fiber optic, or remote connections via a telecommunication link, an infrared link, a radio frequency link, or any other connectors or systems that provide electronic communication. The link 10 may include, at least in part, an intranet, the Internet, or a combination of both. The link 10 may also include intermediate proxies, routers, switches, load balancers, and the like.

FIG. 1, further illustrates a block diagram of the test device 12 to prioritize a plurality of tests in a continuous deployment pipeline. The test device 12 includes a test engine 22 and a decision engine 24. The test engine 22 represents generally a combination of hardware and/or programming that execute the test set in the continuous deployment pipeline. The decision engine 24 represents generally a combination of hardware and/or programming that rank the plurality of tests based on a test attribute and a test context to provide a test rank for each of the plurality of tests. The decision engine 24 also sets a test set for the continuous deployment pipeline using the test ranks.

Figure 2:
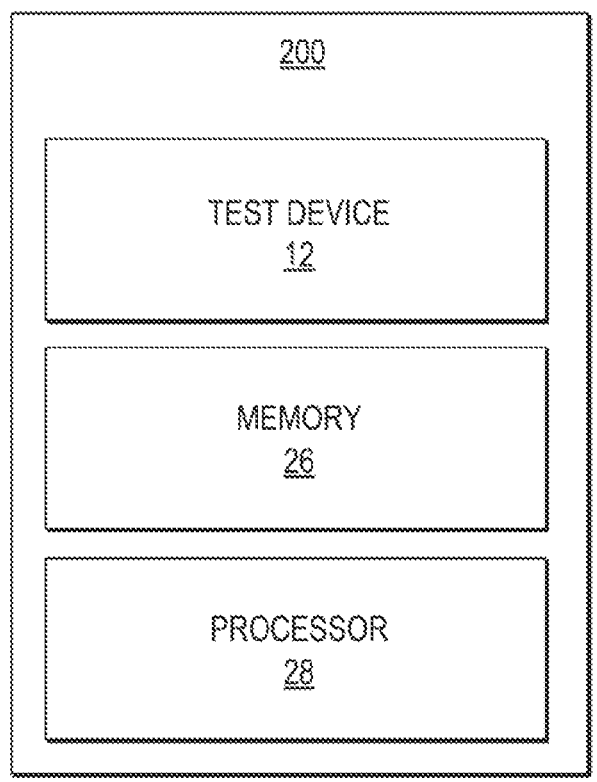
FIG. 2 illustrates a block diagram of an apparatus to prioritize a plurality of tests in a continuous deployment pipeline according to an example.

FIG. 2 illustrates a block diagram of an apparatus 200 to prioritize a plurality of tests in a continuous deployment pipeline according to examples. The apparatus 200 is useable with a continuous deployment pipeline and includes the test device 12, a memory 26, and a processor 28. The test device 12 prioritizes a plurality of tests in the continuous deployment pipeline. The memory 26 stores a set of instructions. The processor 28 is coupled to the memory 26 to execute the set of instructions. The set of instructions set a test set for the continuous deployment pipeline based on a ranking of each of the plurality of tests. The ranking is determined using a test attribute and a test context. The set of instructions also execute the test set in the continuous deployment pipeline and update the test attribute and the test context based on a test result from the execution of the test. The test result including data corresponding to at least one of the test attribute and the test context.

Figure 3:
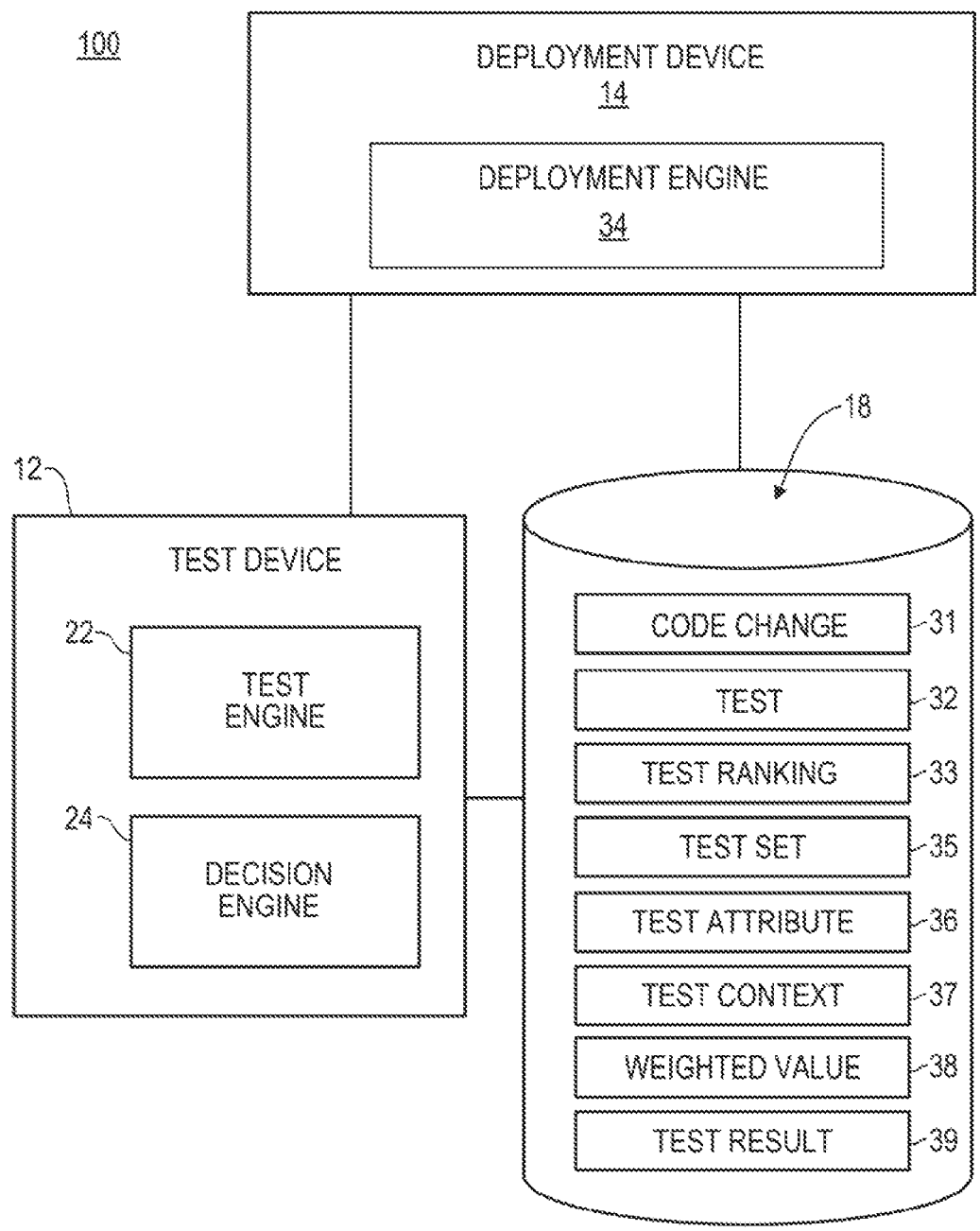
FIG. 3 illustrates block diagram of the system of FIG. 1 according to an example.

FIG. 3 illustrates a block diagram of the system 100 of FIG. 1 according to a further example. The system 100 includes the test device 12, the deployment device 14 and the data store 18. As illustrated in FIG. 1, the test device 12, the deployment device 14, and the data store 18 are connected via the link 10.

The data store 18 may store data accessible by the test device 12 and/or the deployment device 14. The data store 18 is, for example, a database that stores, a code change 31, a test 32 (or plurality of tests), a test ranking 33 (or test rank), a test set 35, a test attribute 36, a test context 37, a weighted value 38, and a test result 39.

The test device 12 is illustrated as including a test engine 22 and a decision engine 24. The test device 12 is connected to the deployment device 14, which receives the code change 31 from the client device 16. The code change 31 is tested in the test device 12 using the tests 32 that have test rankings 33. The test device 12 determines a set of tests or test sets 35 to use in the continuous deployment pipeline during the testing.

The test engine 22 represents generally a combination of hardware and/or programming to execute the test set 35 in a continuous deployment pipeline. The test engine 22 receives an instruction and/or the test sets 35 from the decision engine 24 to execute the test set 35.

The decision engine 24 represents generally a combination of hardware and/or programming that ranks the plurality of tests 32 and sets a test set 35 for the continuous deployment pipeline. The decision engine 24 ranks the plurality of tests 32 based on a test attribute 36 and a test context 37 to provide a test ranking 33 for each of the plurality of tests 32. The decision engine 24 also assigns the test attribute 36 and the test context 37 a weighted value 38. The weighted value 38 is determined based on the continuous deployment pipeline associated therewith. The test attribute 36 and test context 37 are collected as data inputs from multiple sources and are compounded with a weighted value 38 for each continuous deployment pipeline as performance of the tests 32 are requested.

The test attribute 36 comprises data associated with the plurality of tests 32 and previous executions of the plurality of tests 32. Examples of test attributes 36 include the following a test type, such as a system, function, or performance test. The impact that the test type will have on the rank varies depend on the continuous deployment pipeline. For example a comprehensive continuous deployment pipeline may select a single test for each test type, while a quick continuous deployment pipeline may exclude one or more types of tests 32, such as a performance test. Another type of test attribute 36 is the coverage of the application under test (AUT) areas. The coverage of the AUT areas that have a positive impact on test ranking 33 or results in a higher test ranking 33 when the test yields more coverage. Test fixing frequency is another test attribute 36. Test fixing frequency can have a negative impact on the test ranking 33, as the more frequent a test 32 needs to be fixed the less stable and less valuable the test 32. Another test attribute 36 is test cost, such as costs in resources, for example CPU, memory, network, and storage. The more the test costs in resources and/or actual price, such as for cloud-based deployments, the lower the test ranking 33. The last execution time of the test is another type of test attribute 36. For example, the older the last execution time is the higher the test ranking 33. A final example of the test attribute 36 is average execution time, which may result in a test 32 having a lower test ranking 33 because it takes more time to execute and uses more time in the pipeline, which may reduce the total number of tests 32 executed.

The test context 37 comprises at least one of a code change 31, a business priority, and a test value. The test value may include, for example, a value corresponding to the ability of test to detect defects, the importance of defects the test finds, and the dependency of tests 32 on other tests 32. Examples of application lifecycle management test contexts 37 are provided as follows. A test context 37 includes a recent code change 31 linked to the test via requirements and defects. The test context 37 receives a higher test ranking 33 when the test verifies a large number of code changes 31 recently committed. Another test context 37 is the average or sum of the business priorities linked to the test via the requirements. The higher the business priority the higher test ranking 33. Moreover, the test context 37 in this case may be used to filter out no-critical business requires in specific business-critical continuous deployment pipelines. Another test context 37 is an assessment of the ability of the test to find a defect or the average number of defects found by the test per test execution. The more defects the test 32 finds the higher the test ranking 33. Similarly, the average severity and/or importance of the defect found by the test also results in a higher test ranking 33. A final example of the test context 37 is a test's 32 dependency on other tests 32. For example, a comprehensive continuous deployment pipeline may select inter-dependent tests 32 as test groups, while quick continuous deployment pipelines may avoid inter-dependent test to minimize executions and application under test deployments.

The decision engine 24 also sets a test set 35 for the continuous deployment pipeline using the test ranks 33. The decision engine 24 sets the test set 35 using at least one of the following criteria associated with the plurality of tests 32: an execution time, a business value, and a comprehensiveness value. Additional criteria that may be used to determine the test ranking 33 and/or the test set 35 as defined by the deployment device 14, such as costs and resources. For each continuous deployment pipeline, the test rank 33 is computed for all the tests 32 and weights may be associated with the test ranks 33 based on the characteristics of the continuous deployment pipeline. The tests 32 may then be classified and stored with test rankings 33 and weighted values 38 that are easily accessible by the decision engine 24 when the continuous deployment pipeline is executing and the test set 35 is requested by the test device 12 and/or the deployment device 14.

After the continuous deployment pipeline is established, the decision engine 24 sets the test set 35 to meet the criteria of the specific continuous deployment pipeline being executed and provides the test set 35 to the test engine 22. The test set 35 may meet the criteria, such as time, cost, and/or application coverage level criteria, of the specific continuous deployment pipeline, which includes obtaining an optimized or maximal aggregate rank of the tests 32. In meeting the criteria, the test set 35 may not include a high-ranking test (test ranking 33) in order to include a lower-ranking test (test ranking 33) that provides an aggregate rank desired.

Furthermore, the decision engine 24 collects a test result 39 from the executed test set 35. The test result 39 including data corresponding to at least one of the test attribute 36 and the test context 37. For example, the test result 39 may include new found defects and execution times for a test 32. The decision engine 24 updates the test attribute 36 and the test context 37 based on a test result 39 from the execution of the test set 35. Moreover, the decision dynamically collects and automatically updates the test attribute 36 and the test context 37 based on execution of the test set 35. The test engine 22 may simultaneously collect the test result 39 while executing the test set 35. Simultaneous executing the test set 35 and collection of the test results 39 including the test attributes 36 and test context 37 data to determine the test rankings 33 and weighted values 38 may be performed based on the capabilities of the processor and/or computing resources. Moreover, the test rankings 33 and weighted values 38 may also be updated simultaneously with the execution of the test set 35.

The deployment device 14 includes a deployment engine 34. The deployment engine 34 represents generally a combination of hardware and/or programming that deploys the code change 31 after testing in an application under test environment. The deployment device 14 deploys the tested code change 31 via a deployment engine 34. The deployment engine 34 may work together with the test engine 22 and the decision engine 24 to execute the test sets 35. Moreover, the deployment engine 34 controls a continuous deployment pipeline after the code assembly with the code changes 31 pass the test sets 35.

Figure 4:
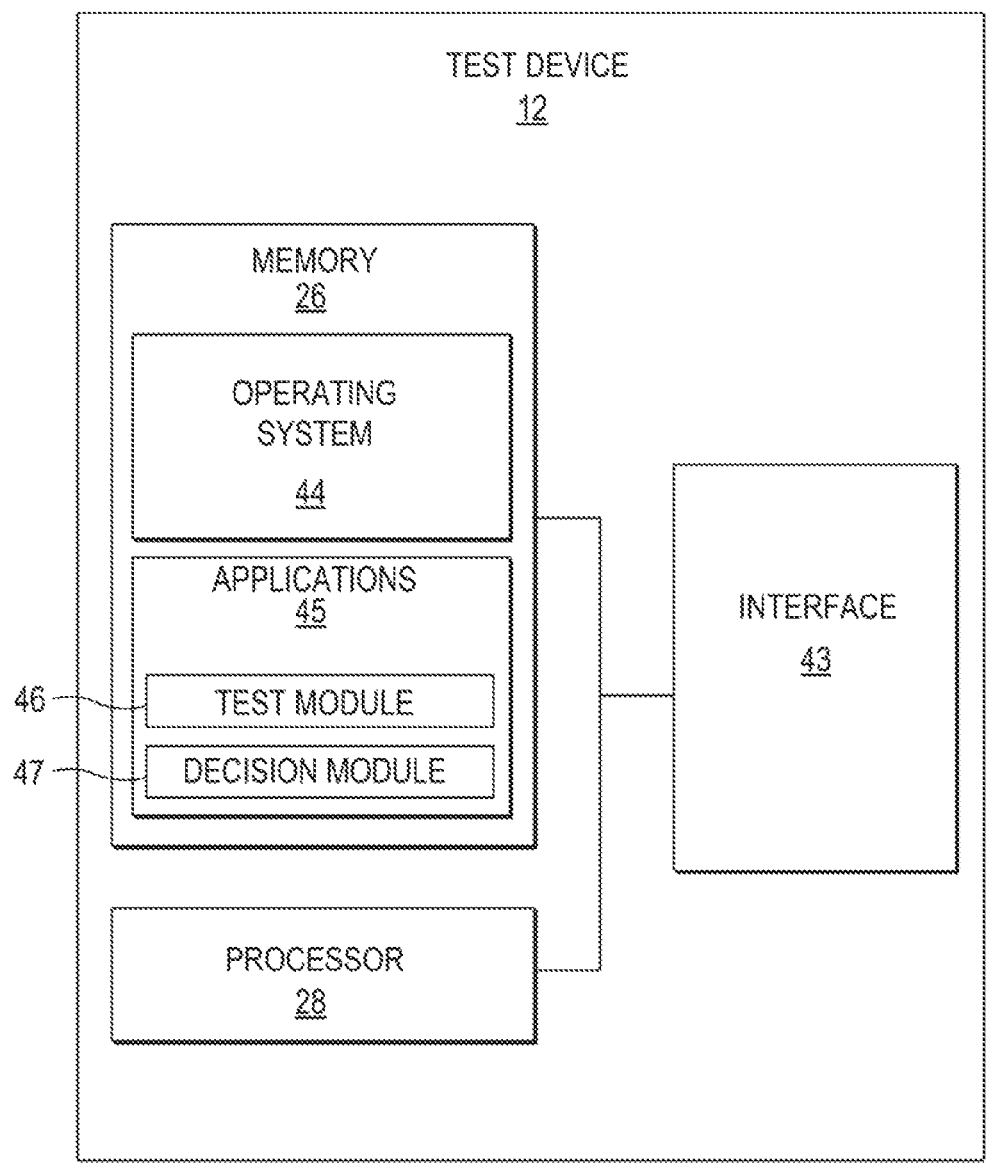
FIG. 4 illustrates a block diagram of a computer readable medium useable with a system, according to an example.

FIG. 4 illustrates a block diagram of a computer readable medium useable with the system 100 of FIG. 1 according to an example. In FIG. 4, the test device 12 is illustrated to include a memory 26, a processor 28, and an interface 43. The processor 28 represents generally any processor configured to execute program instructions stored in memory 26 to perform various specified functions. The interface 43 represents generally any interface enabling the test device 12 to communicate with the deployment device 14 via the link 10, as illustrated in FIGS. 1 and 3.

The memory 26 is illustrated to include an operating system 44 and applications 45. The operating system 44 represents a collection of programs that when executed by the processor 28 serve as a platform on which applications 45 may run. Examples of operating systems 43 include various versions of Microsoft's Windows® and Linux®. Applications 45 represent program instructions that when executed by the processor 28 function as an application that prioritizes a plurality of tests 32 in a continuous deployment pipeline. For example, FIG. 4 illustrates a test module 46 and a decision module 47 as executable program instructions stored in memory 26 of the test device 12.

Referring back to FIGS. 1-3, the test engine 22 and the decision engine 24 are described as combinations of hardware and/or programming. As illustrated in FIG. 4, the hardware portions may include the processor 28. The programming portions may include the operating system 44, applications 45, and/or combinations thereof. For example, the test module 46 represents program instructions that when executed by a processor 28 cause the implementation of the of the test engine 22 of FIGS. 1-3. The decision module 47 represents program instructions that when executed by a processor 28 cause the implementation of the of the decision engine 24 of FIGS. 1-3.

The programming of the test module 46 and decision module 47 may be processor executable instructions stored on a memory 26 that includes a tangible memory media and the hardware may include a processor 28 to execute the instructions. The memory 26 may store program instructions that when executed by the processor 28 cause the processor 28 to perform the program instructions. The memory 26 may be integrated in the same device as the processor 28 or it may be separate but accessible to that device and processor 28.

In some examples, the program instructions may be part of an installation package that can be executed by the processor 28 to perform a method using the system 100. The memory 26 may be a portable medium such as a CD, DVD, or flash drive or a memory maintained by a server from which the installation package can be downloaded and installed. In some examples, the program instructions may be part of an application or applications already installed on the server. In further examples, the memory 26 may include integrated memory, such as a hard drive.

Figure 5:
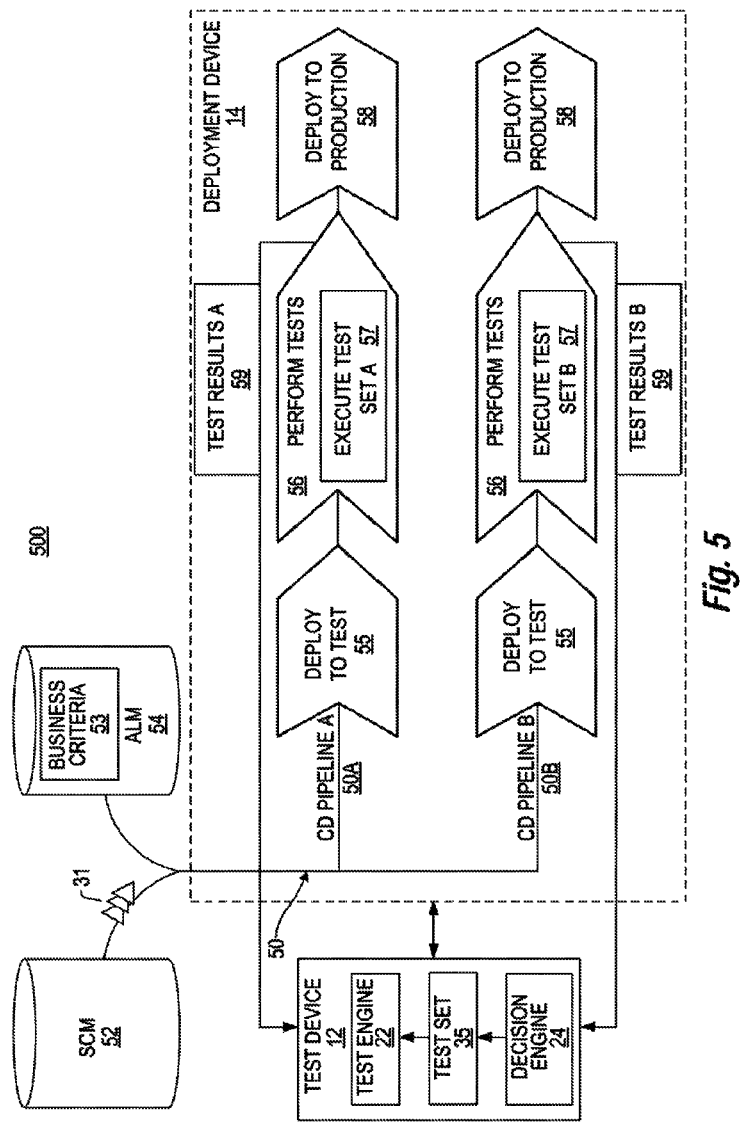
FIG. 5 illustrates a schematic diagram of a process that prioritizes a plurality of tests in a continuous deployment pipeline according to an example.

FIG. 5 illustrates a schematic diagram 500 of the process that prioritizes a plurality of tests 32 in a continuous deployment pipeline according to an example. FIG. 5 illustrates the functions of the test device 12 and the deployment device 14.

The deployment device 14 receives a code change 31 from a source configuration management (SCM) tool 52 and business criteria 53 from an application lifecycle management (ALM) tool 54. The business criteria 53 refers to business factors that are used to assign code changes to a continuous deployment pipeline using, for example, filtering rules. The business criteria 53 may correspond to data associated with the application being modified and/or the code changes, such as author of a code change, number of lines of code in the code change, and/or number of files changed The deployment device 14 assigns the code change 31 to a continuous deployment pipeline 50, such as CD pipeline A 50A or CD pipeline B 50B. For example, CD pipeline 50A may be a high priority pipeline 50A for code changes 31 that are determined by the deployment device 14 to be tested and deployed quickly. Similarly, CD pipeline 50B may be a normal or low priority pipeline. The deployment device 14 provides a deploy to test 55 instruction to the test device 12 to initiate performance of the tests 56.

The test device 12 uses the decision engine 24 to ranks the plurality of tests 32 and sets a test set 35 for the continuous deployment pipeline 50. The decision engine 24 uses a test attribute 36 and a test context 37 to rank the plurality of tests 32. The decision engine 24 may use a variety of test attribute 36 and test context 37 data to rank the tests 32 and determine the test set 35. Additional data that may be considered to determine the test rankings 33 include, for example, the code change 31, the plurality of tests 32, the weighted value 38, and the test results 39. The ranking of the tests 32 for each pipeline and even each code assembly with codes changes 31 are automated and may vary, as the rank specific to the pipeline, the application, and the types of code changes 31. Moreover, the test set 35 may be determined by the decision engine 24 to optimize the tests 32 performed based on the test rankings 33.

After the test set 35 is determined, the test set 35 is provided to the test engine 22, which executes the test set 35 in the continuous deployment pipeline 50 in a simulated or AUT environment. For example, CD pipeline A 50A uses test set A 57, and CD pipeline B 50B uses test set B 57. Depending on the continuous deployment pipeline 50 the test sets may be the same or distinct. The test set 35 execution is illustrated in the perform tests 56 portion of the continuous deployment pipeline 50. The code changes 31 remain in the respective continuous deployment pipeline 50 until the assembly with the code change 31 passes the test set 35 determined by the test device 12. The test results 59 are sent to the decision engine 24 either when all the testing is complete and/or simultaneously during the testing. The Lest results 59 may include test attribute 36 and test context 37 data that is dynamically and automatically collected and complied by the decision engine 24. The test results 59 are then automatically used to determine future test rankings 33 and test sets 35.

After the code changes 31 pass the performance tests 56, including the execution of the test set 35, the deployment device 14 may deploy the assembly with the code changes 31 to production 58 and/or releases a software application with the code change 31.

Figure 6:
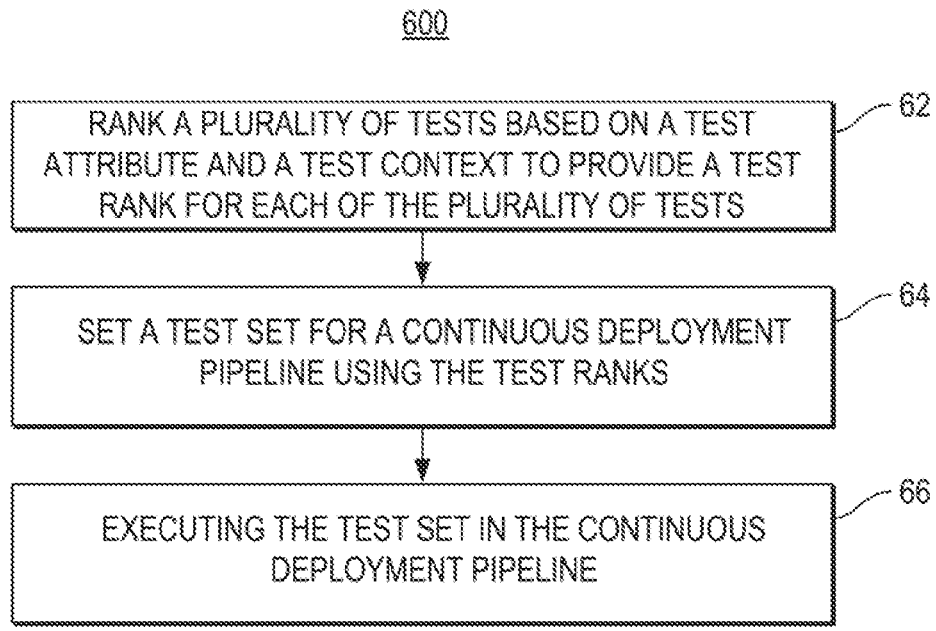
FIGS. 6-7 illustrate flow charts of methods to prioritize a plurality of tests in a continuous deployment pipeline according to examples.

FIG. 6 illustrates a flow diagram 600 of a method, such as a processor implemented method to prioritize a plurality of tests in a continuous deployment pipeline. In block 62, the plurality of tests are ranked based on a test attribute and a test context 37 to provide a test rank for each of the plurality of tests. The test attribute includes data associated with the plurality of tests 32 and previous executions of the plurality of tests. Examples of the test attribute include such as test type, coverage of AUT areas, last execution time, test fixing frequency, test cost, and/or average execution time. The test context 37 includes at least one of a code change, a business priority, and a test value. The test value may include, for example, a value corresponding to the ability of test to detect defects, the importance of defects the test finds, and the dependency of tests on other tests. Other examples of application lifecycle management test contexts include the following: a recent code change linked to the test via requirements and defects, average or sum of business priorities linked to the test, defect fining assessment, an average severity or importance of defects, and/or dependency of test on other tests 32.

The test set for the continuous deployment pipeline is set in block 64 using the test ranks. The test attribute and the test context may also be assigned a weighted value. The weighted value is determined based on the continuous deployment pipeline associated therewith. Moreover, the test attribute and the test context are dynamically collected and automatically updated based on execution of the test set.

In block 66, the test set is executed in the continuous deployment pipeline. Based on the execution of the test set, a test result is collected. The test result includes data corresponding to at least one of the test attribute and the test context. The test result may be simultaneously collected during the execution of the test set. The test result is then used to update the test attribute and the test context based on the test result from the execution of the test set.

Figure 7:
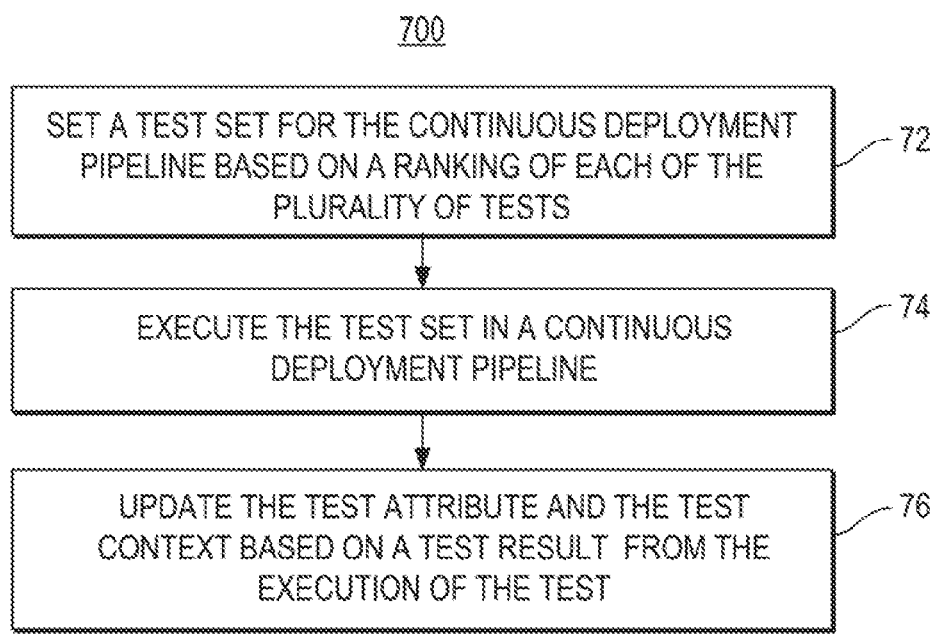

FIG. 7 illustrates a flow diagram 700 of a method, such as a processor implemented method, to prioritize a plurality of tests in a continuous deployment pipeline. In block 72, a test set for the continuous deployment pipeline is set based on a ranking of each of the plurality of tests. The ranking is determined using a test attribute and a test context. The test set is executed in the continuous deployment pipeline in block 74. The test attribute and the test context are updated in block 76. The update is based on a test result from the execution of the test. The test result includes data corresponding to at least one of the test attribute and the test context.

FIGS. 1-7 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A computer implemented method to prioritize a plurality of tests in a continuous deployment pipeline, the method comprising:
    ranking the plurality of tests based on a test attribute and a test context to provide a test rank for each of the plurality of tests;
    setting a test set for the continuous deployment pipeline using the test ranks;
    executing the test set in the continuous deployment pipeline;
    collecting a test result from the executed test set, the test result including data corresponding to at least one of the test attribute and the test context; and
    updating the test attribute and the test context based on the test result from the execution of the test set.

2. The method of claim 1, further comprising simultaneously collecting the test result and executing the test set.

3. The method of claim 1, wherein the test attribute comprises data associated with the plurality of tests and previous executions of the plurality of tests.

4. The method of claim 1, wherein the test context comprises at least one of a code change, a business priority, and a test value.

5. The method of claim 1, wherein the test attribute and the test context are dynamically collected and automatically updated based on execution of the test set.

6. The method of claim 1, wherein the test attribute and the test context are each assigned a weighted value, the weighted value is determined based on the continuous deployment pipeline associated therewith.

7. A system to prioritize a plurality of tests in a continuous deployment pipeline, the system comprising:
    a memory storing a set of instructions; and
    a processor coupled to the memory to execute the set of instructions to:
        rank the plurality of tests based on a test attribute and a test context to provide a test rank for each of the plurality of tests,
        set a test set for the continuous deployment pipeline using the test ranks,
        execute the test set in the continuous deployment pipeline,
        collect a test result from the executed test set, the test result including data corresponding to at least one of the test attribute and the test context, and
        update the test attribute and the test context based on the test result from the execution of the test set.

8. The system of claim 7, wherein the test attribute comprises data associated with the plurality of tests and previous executions of the plurality of tests.

9. The system of claim 7, wherein the test context comprises at least one of a code change, a business priority, and a test value.

10. The system of claim 7, wherein the set of instructions are further executable by the processor to dynamically collect and automatically update the test attribute and the test context based on execution of the test set.

11. The system of claim 7, wherein the set of instructions are further executable by the processor to assign the test attribute and the test context a weighted value, the weighted value is determined based on the continuous deployment pipeline associated therewith.

12. The system of claim 7, wherein the set of instructions are further executable by the processor to set the test set using at least one of the following criteria associated with the plurality of tests: an execution time, a business value, and a comprehensiveness value.

13. An apparatus useable with a continuous deployment pipeline, the apparatus comprising:
    a test device to prioritize a plurality of tests in the continuous deployment pipeline;
    a memory storing a set of instructions; and
    a processor coupled to the memory to execute the set of instructions to:
        set a test set for the continuous deployment pipeline based on a test ranking of each of the plurality of tests, the test ranking determined using a test attribute and a test context;
        execute the test set in the continuous deployment pipeline; and
        update the test attribute and the test context based on a test result from the execution of the test, the test result including data corresponding to at least one of the test attribute and the test context.

14. The apparatus of claim 13, wherein the test attribute comprises data associated with the plurality of tests and previous executions of the plurality of tests.

15. The apparatus of claim 13, wherein the test context comprises at least one of a code change, a business priority, and a test value.

16. The apparatus of claim 13, wherein the processor assigns the test attribute and the test context a weighted value, the weighted value is determined based on the continuous deployment pipeline associated therewith.

17. The apparatus of claim 13, wherein the processor dynamically collects and automatically updates the test attribute and the test context based on execution of the test results.

18. The apparatus of claim 13, wherein the processor sets the test set using at least one of the following criteria associated with the plurality of tests: an execution time, a business value, and a comprehensiveness value.

* * * * *